ated Patent [19]

United States Patent [19]

Vrona et al.

[11] Patent Number: 4,994,750

[45] Date of Patent: Feb. 19, 1991

[54] USE OF CAPACITANCE FOR PROTECTING AGAINST OVERHEATING OF A WATERBED HEATER

[75] Inventors: David W. Vrona, Glen Ellyn; Manley S. Keeler, Naperville, both of Ill.

[73] Assignee: Ohio Mattress Company Licensing & Components, Chicago, Ill.

[21] Appl. No.: 379,855

[22] Filed: Jul. 14, 1989

[51] Int. Cl.⁵ .................... G01R 27/26; H05B 1/02
[52] U.S. Cl. .................... 324/671; 324/664; 324/687; 219/509; 219/217; 219/518
[58] Field of Search ............. 324/61 R, 61 P, 663, 324/664, 671, 689, 690, 687; 73/304 C; 219/212, 217, 518, 509; 361/18, 79, 83, 88, 89, 115, 103; 340/640; 374/136, 184

[56] References Cited

U.S. PATENT DOCUMENTS

| | | | |
|---|---|---|---|
| 3,210,607 | 10/1965 | Flanagan | 361/103 |
| 4,359,626 | 11/1982 | Potter | 219/212 X |
| 4,638,305 | 1/1987 | Sutton | 73/304 X |
| 4,639,831 | 1/1987 | Iyoda | 324/61 R X |
| 4,652,726 | 3/1987 | Femino et al. | 219/518 X |
| 4,749,988 | 6/1988 | Berman et al. | 73/304 X |

Primary Examiner—Reinhard J. Eisenzopf
Assistant Examiner—Jack B. Harvey
Attorney, Agent, or Firm—Willian Brink Olds Gilson & Lione

[57] ABSTRACT

A protection device for a waterbed protects the water bladder and water heater from damage due to overheating when a dangerous condition, such as an insufficient level of water within the bladder or an element of the waterbed surroundings interposed between the bladder and the water heater, arises. The protection device employs a detector in the form of two capacitance plates placed adjacent to the water bladder and connected to a circuit which is operative to prevent power from being supplied to the water heater upon detection of a dangerous condition. The capacitance of the detector plates varies with the level of the water within the bladder and with the presence of a surrounding element between the bladder and heater.

7 Claims, 2 Drawing Sheets

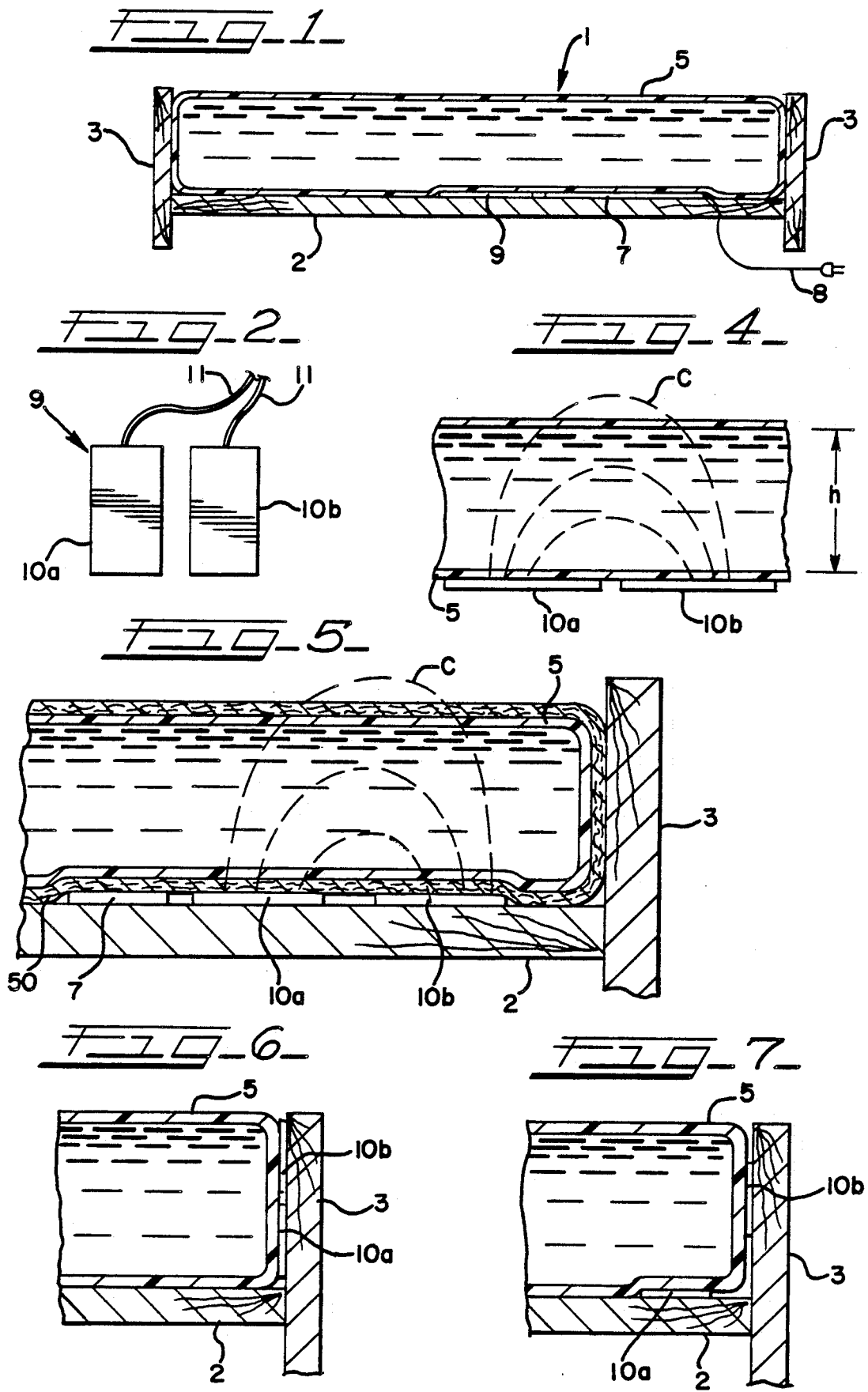

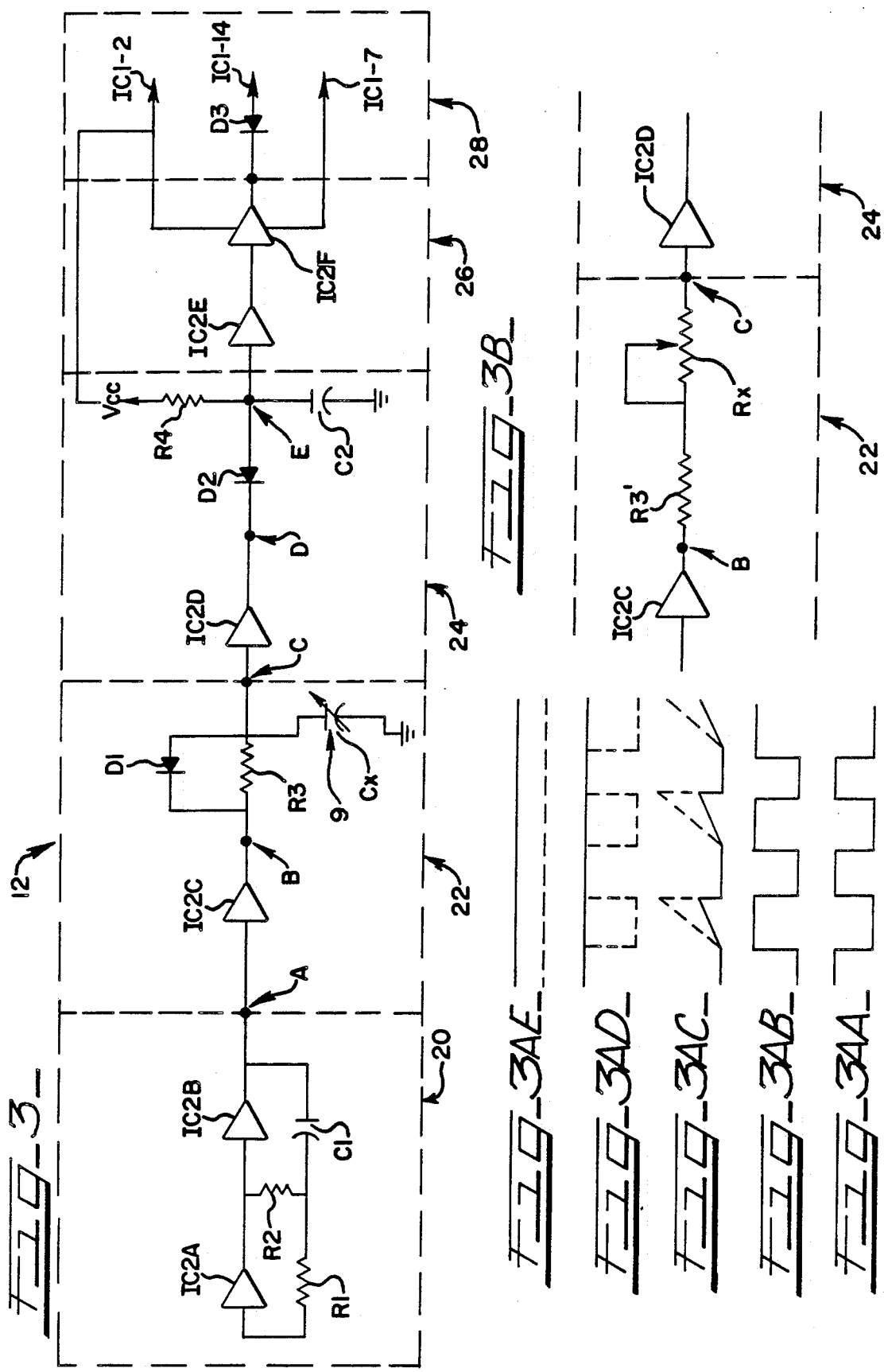

4,994,750

USE OF CAPACITANCE FOR PROTECTING AGAINST OVERHEATING OF A WATERBED HEATER

FIELD OF THE INVENTION

This invention is related to devices for the protection of waterbeds and their surroundings due to overheating of the waterbed heater caused by insufficient water present in the waterbed bladder, or by other dangerous conditions.

BACKGROUND OF THE INVENTION

Waterbeds have become an increasingly popular type of bed. Waterbeds offer many advantages over conventional boxsprings and mattresses.

One such advantage is that a waterbed equally distributes pressure over a person's body, thereby eliminating the frequent discomfort caused by unequal pressure distributions in conventional boxspring and mattress beds.

Another reason why waterbeds have become popular is that the temperature of the mattress can be controlled. In a conventional bed, a person must rely on layers of blankets, turning up the heat in the building, or other means to stay comfortable during cold nights.

By contrast, a waterbed can enhance comfort by means of a water heater generally located underneath the water bladder and controlled by a thermostat. The heater heats the water inside of the water bladder to the desired temperature to make the bladder warmer than the ambient air, thereby making many layers of blankets unnecessary and allowing energy to be conserved by turning down the heat in the building.

Generally, the water heater is controlled only by a conventional thermostat, which has an "off" position, and variable temperature settings when turned on. However, applicant is unaware of any means whereby a waterbed heater may be prevented from activating in the event that there is insufficient water in the water bladder or if other dangerous conditions arise.

When the waterbed is initially installed, the heater is typically first placed on top of the bed frame and the water bladder placed on top of the heater. If the heater is inadvertently turned on before sufficient water is introduced into the water bladder, for example, or if a person forgets to turn the heater off after draining the bed, the temperature of the water heater or of the water in the bladder may rise to a dangerous level. If the melting point of the water bladder is reached, the bladder will be destroyed. If the ignition temperature of the surrounding wood frame or bed clothing such as sheets or blankets, or other surrounding material is reached, a fire may result. It is also possible that a person will inadvertently come into contact with the overheated bladder or water contained therein, and be burned. This danger is especially great to small children.

A dangerous condition may also arise where a person inadvertently places a blanket or sheet or other flammable material between the water heater and the water bladder. In such a case, it is possible that such material may catch fire.

SUMMARY OF THE INVENTION

It is therefore a principal objective of the present invention to provide a device for the prevention of damage to a waterbed and its surroundings, such as from the overheating of a water-depleted bladder by a water heater. To this end, the present invention comprises a water heater connected in a circuit with a heater power supply. A detector means for detecting a depletion of water within the water bladder below a predetermined safe level is provided along with electrical circuit means responsive to the detector means for cutting off power from the heater power supply to the water heater upon detection of a depletion of water below the predetermined safe level.

More particularly, an embodiment of the invention provides detector means in the form of a flat probe having two spaced metallic capacitance plates, the probe being placed adjacent to the water bladder. When an energizing signal is applied to charge the capacitance plates, the voltage attained across the plates will vary with the capacitance of the probe. A signal indicative of this voltage will be generated. The capacitance between the plates is dependent in part upon the material present in an area defined by an arc running between the plates in a plane perpendicular to the plane in which the plates lie. Such an area includes the air between the probe and the water bladder, the cross-section of the water bladder itself, the water within the bladder, and any part of the waterbed surroundings which may be inadvertently interposed between the water heater and the water bladder.

Thus, if the water in the bladder is depleted below a predetermined safe level, or if some element of the waterbed surroundings such as a blanket, a sheet, or other flammable material is interposed between the water heater and the water bladder, the capacitance between the two plates will drop. Such a drop is a reaction indicative of a dangerous condition. An electrical circuit, including a switching arrangement, is connected between the probe and the heater power source, and operates to cut off power to the water heater upon a condition of the probe indicative of a dangerous condition.

In addition, the electrical circuit may be provided with a hysteresis and/or time delay condition which damps out rapidly changing signals created by sloshing of water within the water bladder, such as is produced by movement of a person lying on top of the water bladder. This prevents power to the water heater from being disconnected when no dangerous condition actually exists.

The foregoing features and advantages of the present invention will be further understood by those skilled in the art upon consideration of the following detailed description of an embodiment of the invention taken in conjunction with the accompanying drawings, in which:

BRIEF DESCRIPTION OF THE DRAWINGS

FIG. 1 is an elevated cross-sectional view taken along the length of a conventional waterbed which has been equipped with the present invention;

FIG. 2 is a perspective view of the two metallic capacitance plates which are part of the present invention;

FIG. 3 is a schematic diagram of the circuitry employed in the present invention;

FIGS. 3AA–3AE (herein after referred to as waves or waveforms A-E depict the waveforms of the signals within the circuit of FIG. 3 at various points;

FIG. 3B shows an alternative form of a part of the circuit of FIG. 3;

FIG. 4 is a detailed cross-sectional view, taken generally along the same line as FIG. 1, and illustrating the operation of the preferred probe means of the present invention in detecting a dangerous condition;

FIG. 5 is a cross-sectional view similar to that of FIG. 4 and illustrating the operation of the probe means to detect another type of dangerous condition;

FIG. 6 is an elevated view showing the probe means positioned in a first alternative location; and FIG. 7 is an elevated view showing the probe means positioned in a second alternative location.

DETAILED DESCRIPTION OF AN EMBODIMENT OF THE INVENTION

Referring first to FIG. 1, a conventional waterbed 1 comprises a frame having a base wall 2 which extends in a generally horizontal plane, and two upstanding parallel end walls 3 at the head and foot of the bed respectively. The frame also generally has two upstanding parallel sidewalls 4 (FIG. 6) extending between each end wall 3.

A water bladder 5 located within the frame is filled with water through a suitable valve 6 such as are well known in the art. Bladder 5 is filled to a desired level, and is designed to normally retain the water therein without leakage. Waterbed 1 also comprises heater 7 normally located at a point underneath the center of water bladder 5 and in contact therewith. Heater 7 is connected through a control system 28 (FIG. 3) and plug 8 to a power source through a standard wall outlet (not shown).

A probe 9 is located underneath water bladder 5 adjacent heater 7, and may be integral with the heater. Alternatively, probe 9 may be located remotely from heater 7 either at a non-adjacent point underneath water bladder 5 or mounted on sidewall 4 of the waterbed frame (FIG. 6) by a suitable mount (not shown). As a further alternative, probe 9 may also be positioned as shown in FIG. 7, with one plate 10a located underneath water bladder 5 and a second plate 10b located at the side of water bladder 5. As will be seen, the exact location of the probe 9 is not critical to the operation of the present invention so long as it is located proximate to water bladder 5.

The probe 9 comprises two generally flat, metallic capacitance plates 10a, 10b connected to a circuit 12 by suitable leads 11. The capacitance plates are shown in FIG. 2 as generally rectangular. However, it will be understood that other shapes such as those that one of ordinary skill in the art would find appropriate for the present invention, are contemplated as well. Moreover, neither the size nor the material of the plates 10a, 10b is deemed critical so long as a sufficient change in capacitance exists when a dangerous condition arises.

FIG. 4 illustrates the operation of the present invention in detecting a dangerous condition due to the depletion of water in water bladder 5. When circuit 12 is energized, a certain capacitance results across plates 10a, 10b. This capacitance is dependent upon the combined dielectric constant of the materials located directly between plates 10 and located within concentric arcs schematically illustrated by lines of equipotential C.

Material within arcs C which will have a measurable dielectric effect, and thus have an effect upon capacitance measured across plates 10a, 10b are: the air between the plates and water bladder 5; the composition and thickness of water bladder 5; and the height (or depth) h of the water within water bladder 5. In the filling operation of water bladder 5, water level h will increase as the bladder 5 is filled until the water level is above a predetermined "safe" level. The capacitance between plates 10a, 10b of the probe 9 will increase in proportion to the water level, since water level h strongly influences the dielectric constant between plates 10a, 10b. When a signal which is dependent upon the capacitance of probe 9 is high, heater 7 will be allowed to energize. Before such time, the signal dependent upon the capacitance of probe 9 is low, and heater 7 is held off.

FIG. 5 illustrates the operation of the present invention in detecting a dangerous condition due to the interposition of bed sheets or some other combustible element of the waterbed surroundings between heater 7 and water bladder 5. Since bed sheets or other elements of the waterbed surroundings may not be designed to withstand the heat generated by heater 7, these materials could ignite.

Bedding material 50 which may be a sheet, blanket, or other element of the waterbed surroundings may be inadvertently interposed between heater 7 and water bladder 5. In this preferred embodiment, the probe 9 is an integral part of heater 7. Thus, material 50 is also between capacitance plates 10a, 10b and water bladder 5. Consequently, arc lines C will pass through material 50 in addition to the air between plates 10a, 10b and water bladder 5, water bladder 5 itself, and the water within water bladder 5. As a result, the total dielectric constant of all the material affecting the capacitance between plates 10a, 10b will decrease, making the capacitance between the plates lower. Such a change in the capacitance detected by circuit 12 will result in power cut-off to heater 7 in the same way as described with respect to the dangerous condition resulting from insufficient water in water bladder 5 above.

The preset safe capacitance level for interposed materials can be determined prior to installation of the present invention by experiment with various bedding material or other materials which are likely to form a part of the waterbed surroundings and may become dangerous if placed in direct contact with heater 7.

Turning now to FIGS. 3 and 3AA–3AE, there is shown a schematic diagram illustrating the makeup and operation of the circuit 12 of the present invention. Circuit 12 functionally comprises an oscillator 20, a ramp stage 22, a peak detector 24, and a buffer stage 26 all of which are constructed from the six sections of a standard CMOS hex inverter integrated circuit, such as RCA part number CD4069UBE and commercially available passive components. The sections of integrated circuit 12 have designations beginning with IC2. The sections of the conventional thermostatic control circuit 28 for waterheater 7 have designations beginning with IC1. Circuit 12 is connected to circuit 28 at terminals IC1-2 and IC1-7 of circuit 28.

Oscillator 20 comprises sections IC2A and IC2B of the CMOS hex inverter, resistors R1 and R2, and capacitor C1. Oscillator 20 produces an essentially square wave at its output as shown by waveform A in FIG. 3AA. Square wave A may be any suitable frequency. The preferred frequency is about 20 KHz.

Ramp stage 22 comprises section IC2C of the CMOS hex inverter, diode D1, resistor R3 and probe 9 which has variable capacitance Cx. IC2C acts as an inverter and converts waveform A to waveform B (FIG. 3AB) at its output. Square wave B oscillates from a high point of about Vcc volts to a low of about 0.1 volts, where Vcc is the magnitude of the supply voltage furnished to the integrated circuit 12 through the terminals IC1-2 and IC1-7 shown in FIG. 3.

During the time that signal waveform B is low, probe 9 is held at about 0 volts. When signal waveform B is high, probe 9 charges through resistor R3 at a rate which is dependent upon the resistance of R3 and the probe capacitance Cx. R3 is constant, but the capacitance Cx varies as explained above.

When water bladder 5 is relatively dry, or if an element of the waterbed surroundings is interposed between probe 9 and water bladder 5, Cx is relatively small and probe 9 charges relatively rapidly to a higher voltage as shown by the dotted lines of signal waveform C (FIG. 3AC) which represents the output of ramp circuit 22. When this happens, the switching threshold of component IC2D is reached. This forces the output of IC2D, illustrated by waveform D in FIG. 3AD, to go low for a short period of time as shown by the dotted lines on waveform D.

As water bladder 5 is filled with water and no element of the waterbed surroundings is interposed between probe 9 and bladder 5, Cx becomes larger and the voltage output of the ramp circuit 22 becomes lower as shown by the solid line on waveform C. When this lower signal reaches IC2D, it will no longer be above the switching threshold and output D will be constantly high as shown by the solid line on waveform D.

Peak detector 24 comprises component IC2D of the CMOS hex inverter, capacitor C2 and resistor R4. Capacitor C2 will charge through resistor R4 only when signal waveform D is high. Capacitance C2 and resistance R4 are set so that C2 charges relatively slowly. Each time C2 receives a low pulse from signal waveform D, it is discharged to 0 volts. Thus, so long as low pulses indicated by the dotted line on waveform D are present, capacitor C2 will not fully charge to the heater operating voltage Vcc. In this case, the input signal waveform E (FIG. 3AE) to buffer 26 will be low as indicated by the dotted line, and heater 7 will be deactivated.

If, on the other hand, signal waveform D remains constantly high, indicative of a safe condition, capacitor C2 will charge to the heater operating voltage Vcc indicated by the solid line on waveform E. Heater 7 will then be allowed to activate.

Buffer 26 comprises components IC2E and IC2F of the CMOS hex inverter and serves to stabilize and isolate signal waveform E for better control performance.

Components IC1-2, IC1-14 and IC1-7 are integral parts of the integrated circuit 28 which normally controls a conventional water heater 7. When pin IC1-14 of the heater controller 28 is grounded by a low signal through pin IC1-2 connected to signal waveform E through resistor R4, such as when a dangerous condition is detected, heater 7 is held off regardless of the thermostat or on-off setting. When signal waveform E is high, in the absence of a dangerous condition, then diode D3 is turned off, permitting heater 7 to operate in normal fashion.

The sensitivity of the circuit is primarily controlled by setting the value of resistor R3. In operation, this resistance will be set depending on the material which water bladder 5 is made of. Normally, about two inches of water is considered a safe level of water, so R3 can be chosen to allow the threshold point of IC2D to be reached when this much water is present in bladder 5.

When a blanket or sheet or other element of the waterbed surroundings are interposed between water bladder 5 and probe 9, Cx will drop rapidly, thus increasing the maximum voltage of signal waveform C and making signal waveform D go low for all operational ranges of the resistance of R3.

An alternative form of a part of circuit 12 is shown in FIG. 3B in which resistor R3 is made variable. In this embodiment, R3 is replaced by fixed resistor R3' and variable resistor Rx connected in series. As the resistance of Rx is increased, circuit 12 becomes more sensitive to the presence of interposed elements and lower levels of water in bladder 5. Thus, the sensitivity of circuit 12, and consequently the safe level of water in bladder 5, may be adjusted either by the waterbed manufacturer, the dealer, or the ultimate user.

While the present invention has been described in connection with a certain presently preferred embodiment, those skilled in the art will recognize many modifications to structure, arrangement, portions, elements, materials and components which can be used in the practice of the invention without departing from the principles of this invention.

We claim

1. In a waterbed having a frame with upstanding sidewalls, a water bladder for containing water, said water bladder received within said frame, and a water heater for heating water within the bladder, said heater electrically connected to a heater power supply, a waterbed protection device comprising:

probe means adjacent to said water bladder for detecting the presence of a dangerous condition, said probe means including detection means for measuring capacitance across said bladder and generating a signal corresponding to said capacitance, said capacitance having a threshold value indicative of the presence or absence of the dangerous condition; and electrical circuit means responsive to said probe means to cut off power from said heater power supply to said water heater upon an indication by said probe means of the presence of said threshold value, whereby heating of said water bladder will not take place if said dangerous condition is present.

2. The water bed protection device of claim 1, wherein said probe means is a generally flat probe having two capacitance plates, said probe being an integral part of said water heater.

3. The waterbed protection device of claim 1, wherein said probe means is a generally flat probe having two capacitance plates, at least one of said plates being mounted on one of said upstanding side walls of said frame.

4. The waterbed protection device of claim 1, wherein said electrical circuit means is further provided with hysteresis to prevent cutting off power to said heater upon sloshing of water within said water bladder without a level of water below said predetermined level being present.

5. In a waterbed having a frame with upstanding sidewalls, a bladder for receiving a liquid defining a dielectric medium, said bladder received within said frame, and a heater for heating said liquid within the bladder, said heater electrically connected to a heater power supply, a waterbed protection device comprising:

probe means adjacent to said bladder for detecting a change in capacitance resulting from a change in said dielectric medium, said probe means including means for measuring capacitance and generating a signal corresponding to said capacitance within predetermined threshold values of said capacitance; and electrical circuit means responsive to said probe means for cutting off power from said heater power supply to said water heater upon an indication by said probe means of a change in thickness of said dielectric medium, whereby heating of said water bladder will not take place if said change in said thickness of said dielectric medium exceeds a predetermined amount.

6. The waterbed protection device in claim 5, wherein said probe means is operable to detect a change in said capacitance resulting from a change in the level of said dielectric medium.

7. The waterbed protection device in claim 5, wherein said probe means is operable to detect a change in said capacitance resulting from the addition of an object adjacent said bladder, said object defining a second dielectric medium.

* * * * *